(12) United States Patent
Monk et al.

(10) Patent No.: US 7,244,043 B2
(45) Date of Patent: Jul. 17, 2007

(54) METHOD AND SYSTEM FOR A PROCESSOR CONTROLLED ILLUMINATION SYSTEM FOR READING AND ANALYZING MATERIALS

(76) Inventors: Bruce C. Monk, 8 Robin Dr., Hudson, NH (US) 03051; Joseph E. Funk, Jr., 26 Wildwood St., Manchester, NH (US) 03104

( * ) Notice: Subject to any disclaimer, the term of this patent is extended or adjusted under 35 U.S.C. 154(b) by 0 days.

(21) Appl. No.: 11/214,304

(22) Filed: Aug. 29, 2005

(65) Prior Publication Data

US 2006/0018508 A1    Jan. 26, 2006

(51) Int. Cl.
   *F21V 1/00*    (2006.01)
(52) U.S. Cl. .................. 362/239; 362/11; 362/97; 362/234; 362/295
(58) Field of Classification Search ............. 362/239, 362/11, 97–99, 295, 234; 358/474, 475; 355/67, 70; 353/63–65
See application file for complete search history.

(56) References Cited

U.S. PATENT DOCUMENTS

| | | | |
|---|---|---|---|
| 6,724,490 B2 * | 4/2004 | Ono | 356/614 |
| 6,785,405 B2 * | 8/2004 | Tuttle et al. | 382/112 |
| 6,969,843 B1 * | 11/2005 | Beach et al. | 250/228 |
| 2002/0136009 A1 * | 9/2002 | Yoneda | 362/249 |

* cited by examiner

*Primary Examiner*—Sandra O'Shea
*Assistant Examiner*—Mark Tsidulko
(74) *Attorney, Agent, or Firm*—Joseph E. Funk (57) ABSTRACT

A method and system are described for illuminating a document, such as passports, identity documents or other types of documents, using illumination means under control of a processor to effectively control the angle and direction of light on such documents to expose optically variable devices such as holograms, intaglio printing and optically variable coating and inks contained in or on the documents and the material laminating the documents.

11 Claims, 4 Drawing Sheets

METHOD AND SYSTEM FOR A PROCESSOR CONTROLLED ILLUMINATION SYSTEM FOR READING AND ANALYZING MATERIALS

FIELD OF THE INVENTION

The present invention relates generally to lighting and optical assemblies and, more particularly, to a processor controlled lighting system for controlling illumination of documents and their laminates to expose optically variable devices such as holograms and intaglio printing, and optically variable coating and inks.

BACKGROUND OF THE INVENTION

Illegal modifications and counterfeiting of identification documents, such as passports, drivers licenses, and identification cards and badges; and documents of value, such as bonds, certificates and negotiable instruments, has been increasing year by year to the concern of companies, governments and their agencies that issue these documents. To counter this problem new materials have been and are being developed for the production of such identity documents and documents of value, that make it more and more difficult to alter or counterfeit the documents, and easier and faster to detect if such documents are counterfeit or have been altered.

These new materials utilize new laminating schemes and materials that utilize optically variable devices, invisible inks that only appear when illuminated by certain wavelengths of visible or invisible light; retro-reflective layers inside the laminating materials; different types of inks that have one color under normal ambient light but show up as different colors when illuminated by certain wavelengths of invisible light, and many other schemes. In addition, magnetic and radio frequency (RF) taggants may be added to the laminates or base material of documents during their manufacture, and such taggants may be detected while being invisible to the eye. Further, micro-miniature smart chips may be embedded in such documents, such as they are in smart cards, and used in reading and verifying documents such as listed above.

The rise of passports, documents of value, and other security and identification documents having anti-counterfeiting, anti-alteration and verification features, and the new laminating materials, some of which are briefly described above, have created a growing need for new and improved document reader, verifier equipment that can rapidly read, verify, and analyze many different types of passports, documents of value, identity and security documents made utilizing the new materials, techniques and laminating materials described above. Such document reader, verifier equipment is desperately needed at high traffic locations, such as international airports around the world, where millions of travelers pass between countries each year. However, such new and improved equipment is also needed for many other applications such as reading and checking identity badges of employees and others in high security installations where government or industrial confidential or secret information is to be protected, and access and movements are carefully limited, controlled and recorded. In addition, such new and improved reader verifier equipment is desperately needed to check different types of documents of value.

Document reader verifier equipment for identity documents and documents of value require document illumination and imaging systems to illuminate documents with light of different wavelengths and with the light being applied to documents at different angles in order to detect and/or verify security features and unauthorized alterations in such documents. As new types of security features are created and used in such identity documents and documents of value there is a need in the prior art for new and improved document reader verifier equipment and the illumination and imaging systems used therein.

SUMMARY OF THE INVENTION

An improved processor controlled document lighting system and method is disclosed for illuminating documents and their laminates to show optically variable devices such as holograms intaglio printing, optically variable coating and inks and similar things. The improved illumination and imaging system and method has a processor for controlling the operation and intensity of a plurality of illumination means. The result is to effectively alter the angle and direction at which light from the plurality of illumination means is projected upon documents being read and verified. Thus, OVD images present in document laminating materials or in or on the documents themselves can be made to appear for imaging by optical means no matter what light source must be directed onto a document in order to make its unique properties visible. In addition, the angle and direction of light onto a document may be changed to make an optically variable device in a document laminating material disappear so that the underlying document may be imaged, read and analyzed.

DESCRIPTION OF THE DRAWING

The invention will be better understood upon reading the following detailed description in conjunction with the drawings in which.

DETAILED DESCRIPTION

While document reading and authentication equipment in which the novel document illumination means of the present invention is utilized may be used to read and verify identity documents and documents of value, the example described in this specification is for document reading and authentication equipment that reads and verifies identity documents. Such identity documents include, but are not limited to, passports, identity cards, drivers licenses, and cards for access to secure areas.

Throughout this Detailed Description the term OVDs (optically variable devices) is used to refer to holograms, intaglio printing, optically variable coatings and inks, and all other similar materials and devices that require changing the angle of illumination in order to make its unique properties visible.

Figure 1:
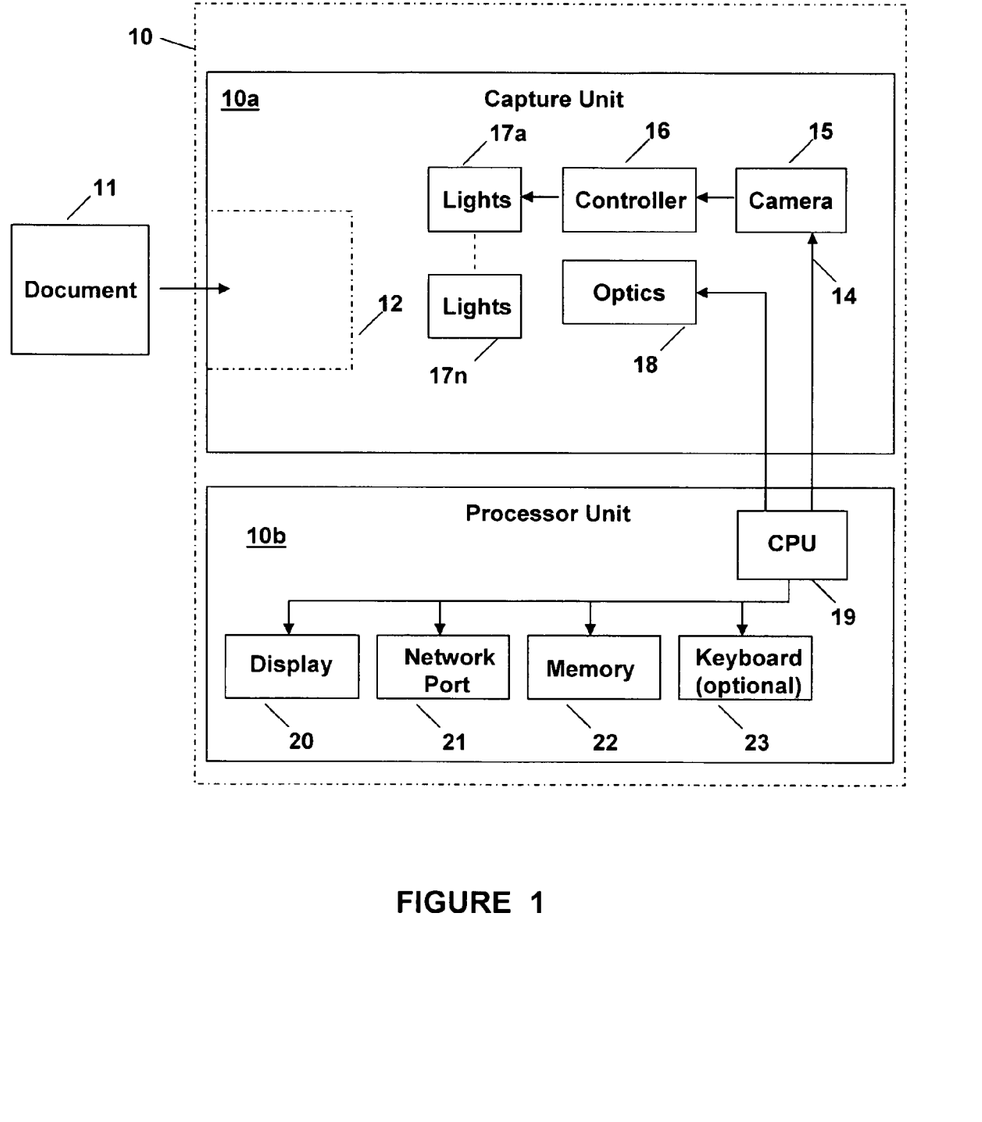
FIG. 1 is a block diagram is a block diagram of a document reader verifier system for reading and authenticating documents in which the processor controlled illumination system of the present invention is utilized.

In FIG. 1 is shown a block diagram of document reading and authentication equipment 10 in which the novel document illumination means of the present invention is utilized. Details of the novel document illumination means are shown and described in detail with reference to FIGS. 2-4. Equipment 10 comprises two pieces, a capture unit 10a and a processor unit 10b that are separate but electrically connected. However, both units can be located in the same box. Processor unit 10b has a CPU 19 operating under control of a program stored in memory 22 to illuminate, image, read and authenticate documents. In the following description a passport is referenced as a document 11 being read and authenticated. On the inside page of a passport 11 is located a photograph, bibliographic and other information about the bearer of the passport. This information includes passport number, issuance and expiration dates, issuing authority, and may include biometric information about the person to whom passport 11 is issued. See International Civil Aviation Organization (ICAO) specification 9303, Part 1, entitled "Machine Readable Passports" for more details regarding the requirements for passports.

As the laminated first page of a passport 11, on which is the photograph and other information regarding the person to whom the passport is issued, is placed on glass plate 12, its presence is sensed by CPU 19 detecting a change in the video output from camera 15. To do this, infrared lights 17a are enabled until document 11 is placed on glass plate 12 and a change in the video output from camera 15 is sensed by CPU 19.

Generally, light sources 17a-17n comprise a plurality of visible and invisible light sources or other excitation means of different wavelengths that are described in greater detail hereinafter with reference to FIGS. 2-4. In the preferred embodiment of the invention described herein, lights 17a-17n selectively generate white, near infrared, and ultraviolet A, B and C light under the control of CPU 19. A special instance of these light sources 17a-17n uses near-infrared (IR) and blue light from light emitting diodes to emulate a point source of light and illuminate a page of document 11. Such illumination is done coaxially ("direct") with the path light travels to illuminate document 11 being the same as the light reflected light from the document. Camera 15 has an operational frequency range that is able to image 400 nanometer to 1 micron, visible to near-IR. It can also be enhanced with transluminance materials to shift the response range to detect frequencies outside this range. The capabilities of camera 15 may also be extended to add filters or include transducers sensitive to frequencies in any range.

In addition, all light sources 17a-17n have programmable output intensities that combine to effectively change the direction of light illuminating a document, and LED sources may be pulsed to achieve higher peak power levels that provide greater illumination of the document and to help to expose security markings and unauthorized alterations at different levels within the passport. The frequency of pulsing of light sources 17a-17n is high enough that the pulsing cannot be detected by camera 15. The light from the multiple light sources 17a-17n is reflected from the laminated page of passport 11 on glass plate 12 and impinges on optics 18 which focuses the image for camera 15.

Camera 15 is preferably a high-resolution, color, solid-state camera that is controlled by CPU 19, and produces digitized color pictures. Camera 15 and near-IR light sources 17a are continuously operating while document reading and authentication equipment 10 is powered up and awaiting detection of the presence of a passport or other document 11 on glass plate 12. When equipment 10 is to commence functioning, the presence of a passport or other document 11 on glass plate 12 is detected by camera 15. CPU 19 energizes white light sources and a first picture is sent to CPU 19 via an interface link 14. When processor unit 10b is spaced from capture unit 10a, link 14 is a high-speed, digital interface such as conforms to the IEEE 1394 standard, high-speed Ethernet, or a universal serial bus (USB), or other future protocols. The color picture is in a digitized format and CPU 14 stores it in memory 22. In some instances where color pictures are not needed gray scale pictures may be utilized.

A high capacity storage device, such as a hard disk drive, that is part of memory 22 is used to store pictures captured by camera 15 of documents 11 for processing. Memory 22 also comprises other static and dynamic memory that function with CPU 14 in a manner well known in the art.

Processor unit 10b may optionally include a number of other elements such as: (a) a network port 21 that can be used to connect apparatus 10 to a server on a local area network (LAN) or wide area network (WAN), (b) a display 20 which comprises lights to indicate to the equipment operator or the bearer of document 11 whether or not document 11 is valid or not, and a video display for use by the operator of equipment 10, and (c) an optional keyboard 23 for use by the operator of equipment 10 to manually enter information and for manually controlling the operation of apparatus 10.

Other apparatus, not shown, may be provided as required by specific applications, such as but not limited to, a bar code reader, a magnetic stripe reader, iris reader, fingerprint reader, a signature capture device, gate controller, and/or a smart card reader.

Figure 2:
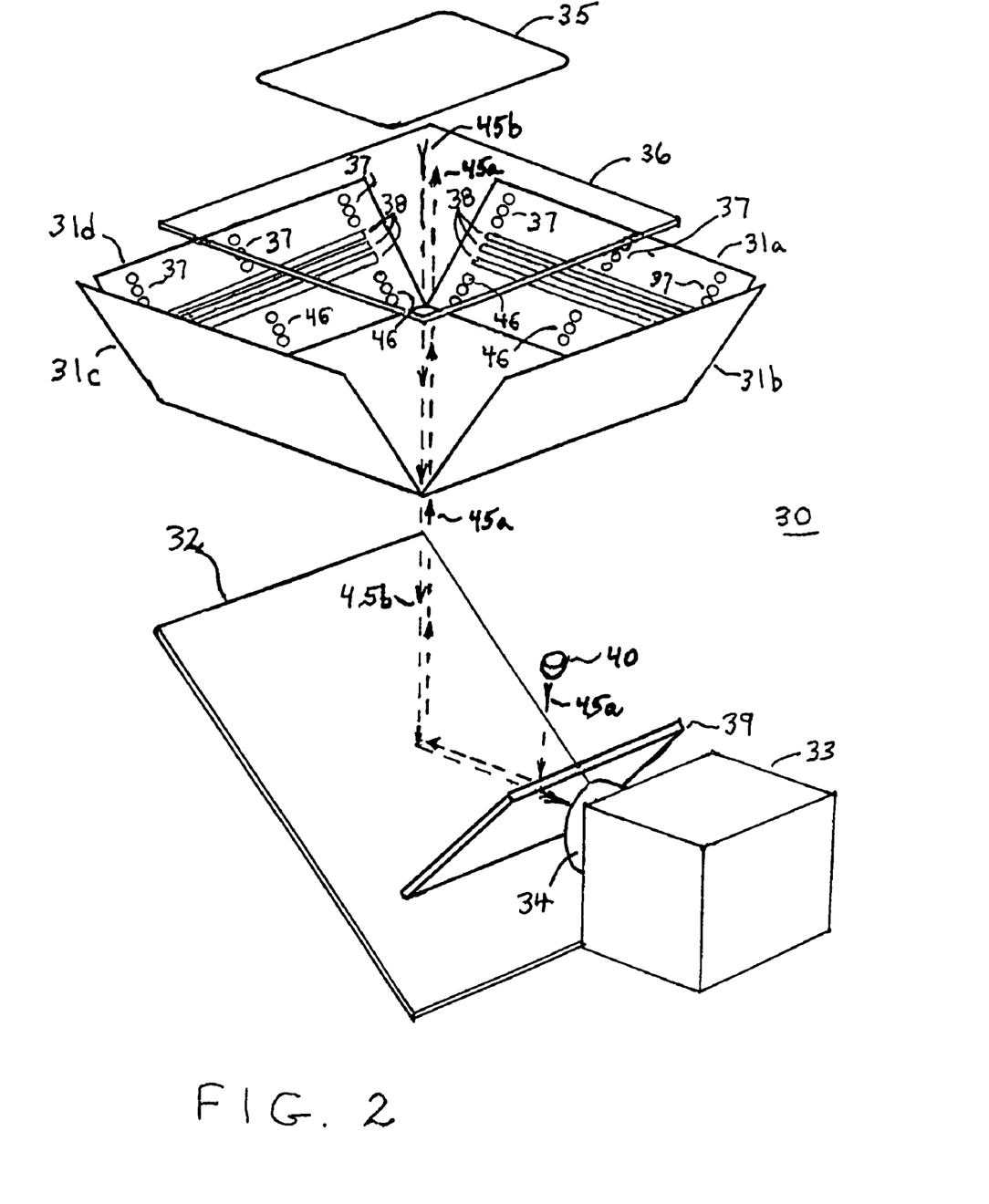
FIG. 2 shows a three dimensional view of how the novel document illumination means of the document reader verifier system illuminates materials to be imaged by a camera to be read and analyzed.

In FIG. 2 is shown a three dimensional view of the novel illumination means for illuminating documents 35 to be imaged by a camera 33 and read and analyzed by CPU 19. Shown are a glass plate 36 on which a document 35, such as a passport, is placed face down. Underneath and to the four sides of glass plate 36 are four circuit boards 31a through 31d on each of which are mounted a plurality of white and infrared LED light sources 37, white light sources 46, and gas discharge ultraviolet light sources 38. In FIG. 2 are only shown a small number of the actual LED light sources 37 on each circuit board. This is done only for the sake of simplicity as not to clutter up FIG. 2. FIG. 3 shows the actual light sources in detail.

As is shown in FIG. 2, the light emitted by light sources 37, 38 and 46 are angled upward to illuminate document 35 due to the angled position in which boards 31a-31d are mounted with respect to glass plate 36. This lighting is termed "indirect" lighting because the illuminating light travels a path that is different than the path traveled by the reflected light as generally indicated by dashed line 45b. The image of illuminated document 35 is reflected from angled mirror 32 and through beam splitter 39 to optics 34 to be imaged into camera 33. Ones of white LED light sources 37 and 46 are selectively energized at different power levels to produce different intensities, as described further in this specification. This effectively illuminates document 35 at different angles per the teaching of the present invention. This is done to expose OVDs and such things that are only exposed by illuminating a document 35 with light at specific angles with respect to the unique construction of the document. Infrared ones of light sources 37 plus ultraviolet A, B and C light sources 38 illuminate document 35 with different wavelengths of light to expose and read various information on document 35, to detect various security features utilized in document 35, its base material, laminating material (not shown), or an overcoating such as a crystogram, and to detect alterations to the document.

More particularly, to make it harder to alter or counterfeit documents, new security measures are continually being developed to make it more difficult to alter or counterfeit documents. Over time such new measures have included the use of chemical taggants to produce different papers, threads, and types of inks to imprint information. These taggants show up differently under lights of different color, including invisible light such as ultraviolet and infrared. These taggants may also be magnetic or have other properties that are not apparent, but which are detectable when using the proper excitation source and sensor or camera. Further, alterations made to documents containing such security materials, that may be invisible to the naked eye, appear when excited with certain wavelengths of light or electromagnetic energy. Still further, special paper may be utilized that is not visibly damaged by attempts to alter the passport, but the damage can be detected using certain wavelengths of visible and invisible light.

In addition, certain inks, such as those containing carbon black, absorb infrared light. Other inks do not absorb infrared light, but are transparent to it or reflect it. Both types of inks may appear to be the same color under normal light, but when illuminated with near infrared light certain printed material disappears while other printed material is visible.

More specifically, printing on a document is generally in black, but MRZ items on a document, such as a passport, will be printed with the special near infrared absorbing (B900) black ink to conform to international standards. Under visible light all printing appears as black. When illuminated with a near infrared source only matter printed with the special B900 ink will appear, while all other printing disappears. CPU 19 in capture unit 10a, under control of its stored program, knows where to look for the special ink printing in a digitized image made under illumination of a near infrared source from a retrieved document definition file. If the near infrared responsive images are in the specified areas, whether they are alphanumeric text or certain patterns or images, they will be located and identified by CPU 19 as one indication that document 35 has not been photocopied and is authentic.

A long wave ultraviolet (UV-A) light causes certain inks and fibers on/in a document to fluoresce so they are visible within the image captured by camera 33, while all other areas on the document image disappear, and inks and fibers that fluoresce only under UV-B and UV-C wavelengths do not fluoresce to be made visible for imaging. Long wave ultraviolet (UV-A) from lamp 38a has a wavelength of 315-400 nanometers (nm). Medium wavelength (UV-B) light from lamp 38b causes other inks and fibers to fluoresce so they are visible within the image captured by camera 33, while all other areas on the document image disappear, and inks and fibers that fluoresce only under UV-A. Short wavelength (UV-C) light from lamp 38c causes other inks and fibers to fluoresce to be made visible for imaging. Medium wave ultraviolet (UV-B) has a wavelength of 290-315 nanometers. A short wave ultraviolet (UV-C) causes still other special inks and fibers to fluoresce so they are visible within the image captured by camera 33, while all other areas on the document image disappear, and inks and fibers that fluoresce only under UV-A and UV-B wavelengths do not fluoresce to be made visible for imaging. Short wave ultraviolet (UV-C) has a wavelength of 220-290 nanometers. Material printed with special ink that fluoresces under UV-A, UV-B or UV-C may be printed on a document that is laminated, or may be imprinted in or on the laminating material.

Figure 3:
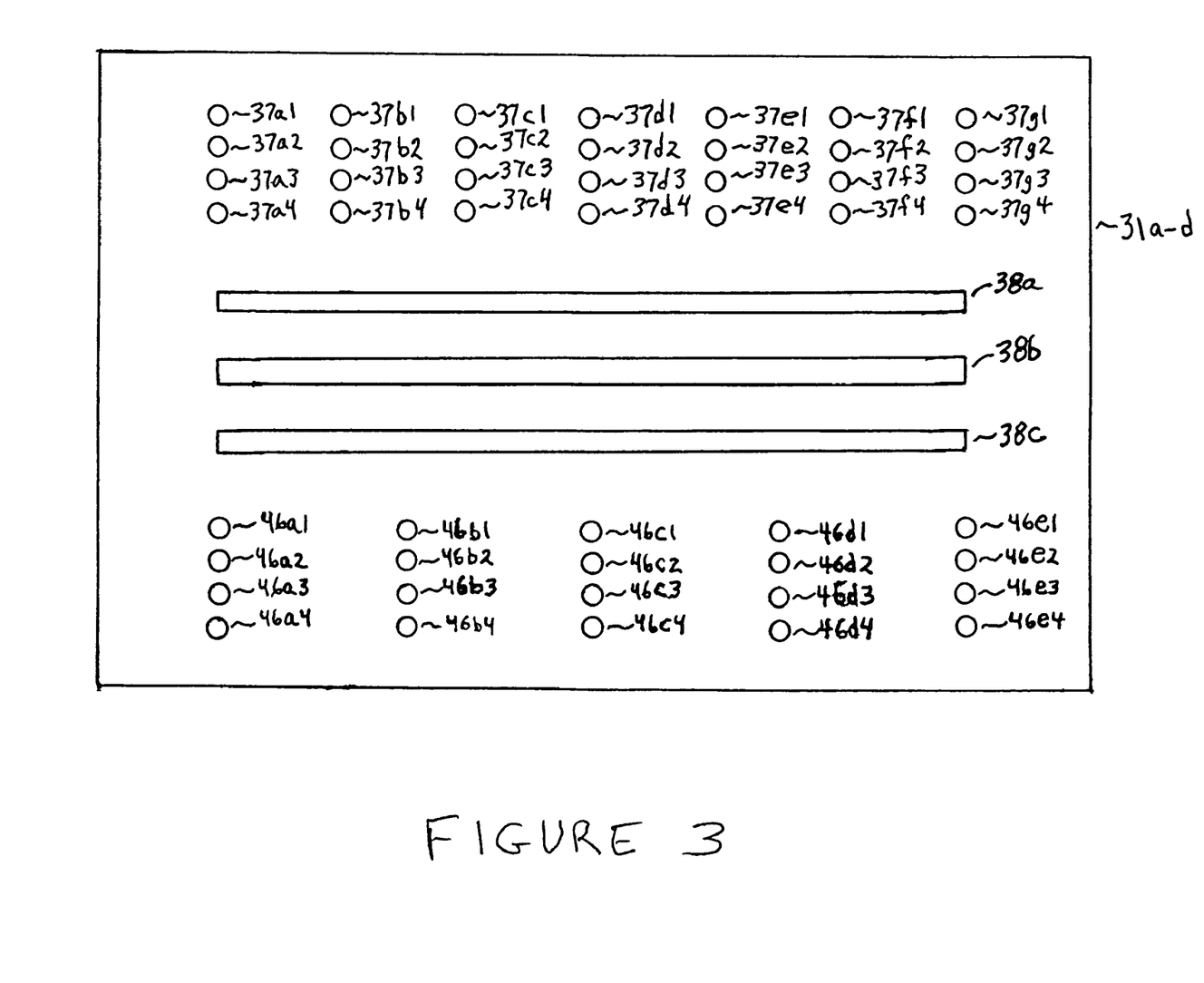
FIG. 3 shows the organization of illumination means on individual circuit boards of the novel document illumination means of the document reader verifier system.

In FIG. 3 is shown the actual organization of the illumination means 37, 38 and 46 on each of circuit boards 31a-31d shown in FIG. 2 for the illumination of documents 35. In the preferred embodiment of the invention each of the four circuit boards 31a-31d has twelve groups of four light sources 37 and 46 and three ultraviolet gas discharge light sources 38 oriented as shown in FIG. 3. They are shown as upper light sources 37a1-37a4 through 37g1-37g4, lower light sources 46a1-46a4 through 46e1-46e4, and the three ultraviolet light sources 38a, 38b and 38c. There may be fewer or more than four light sources per group, or fewer or more than the twelve groups of four light sources per circuit board. Further, fewer than four circuit boards 31 may be utilized. Light sources 37a1-37a4 through 37g1-37g4 and 46a1-46a4 through 46e1-46e4 are preferably light emitting diodes (LEDs) but other types of light sources may be utilized. For example, each LED may be replaced by a piece of fiber optic cable through which light travels from a remote light source of the desired wavelength(s). Ultraviolet light sources 38a-38d are gas discharge lamps but other types of sources of ultraviolet light may be utilized. In addition, other types of emitters, such as small RF emitters (not shown), may be mounted on one or more of the circuit boards 31 to read smart chips in documents.

In FIG. 3 LEDs 37b1-37b4, and 37f1-37f4, 37c2, c4, d2, d4, e2 & e4 emit near infrared light. LEDs 46a1-46a4 through 46e1-46e4, 37a1-37a4; 37g1-37g4, 37c1, c3, d1, d3, e1 & e3 emit visible white light. Although not shown in FIG. 3 lower LEDs 46a1-46a4 through 46e1-46e4 are not mounted perpendicular to each of circuit boards 31a-d. They are all angled upward about ten degrees off perpendicular in the direction of upper LEDs 37.

Figure 4:
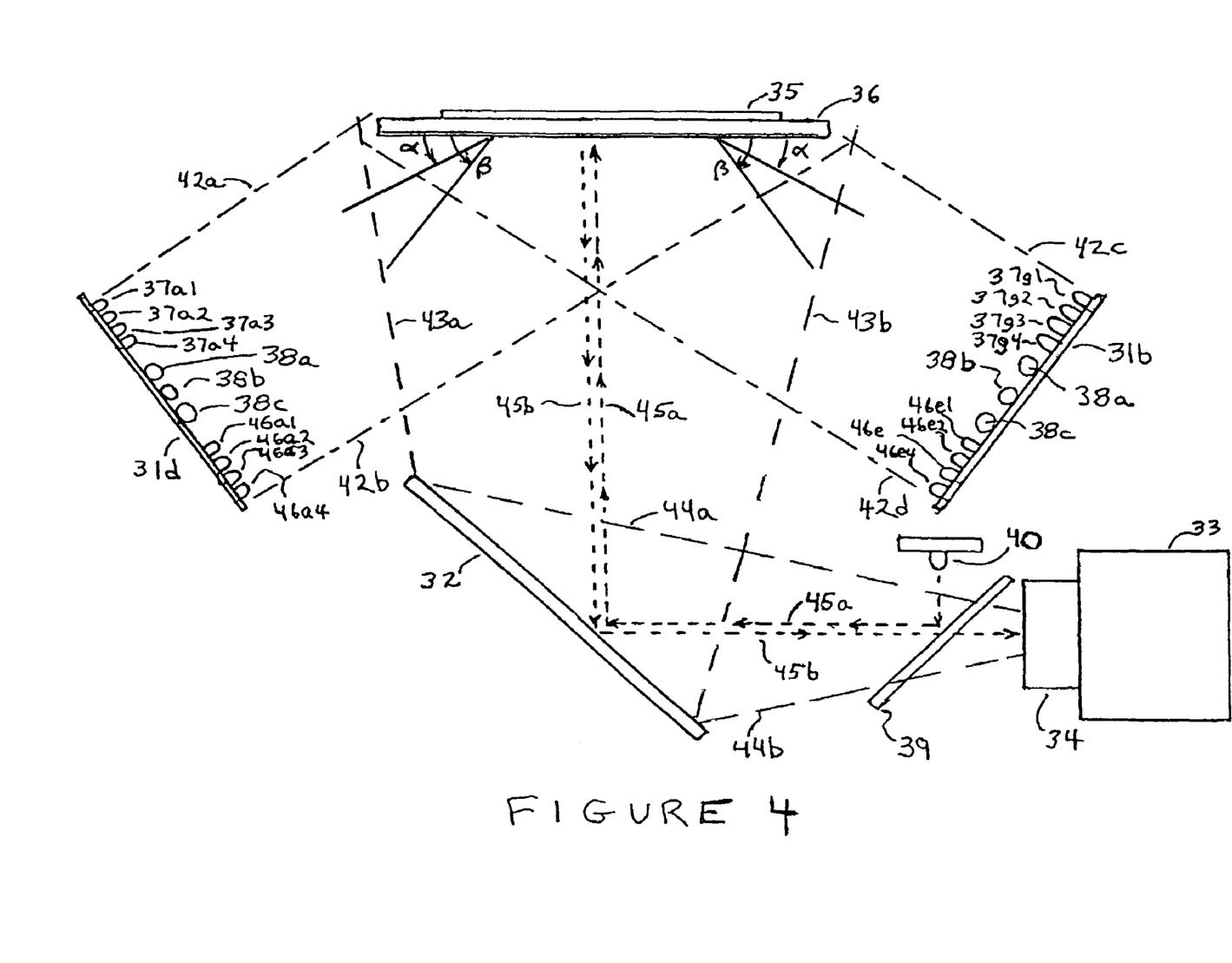
FIG. 4 shows a side view of the novel document illumination system showing how the illumination means thereof illuminate documents, and images of the documents are input to a camera to be read an analyzed.

In FIG. 4 is shown a side view of two of the circuit boards 31b and 31d of the illumination system showing how the illumination means that illuminate a document 35, and images of the documents are input to a camera 33 to be read an analyzed. Due to this side view only the closest light sources 37a1-a4 and 46a1-a4 on board 31d, and light sources 37g1-g4 and 46e1-e4 on board 31b may be seen. The remaining LED light sources on each of circuit boards 31d and 31b are obscured and are not shown in this Figure. As previously mentioned all of LEDs 46 are not mounted vertically to circuit board 31b&d. Rather, all of LEDs 46 are angled upward about ten degrees toward LEDs 37.

Generally, light sources 37a1-a3 and 46a1-a4 (shown), and the other light sources 37 and 46 (not shown) behind them, illuminate document 35 on glass plate 36 as generally represented by dashed lines 42a and 42b. Similarly, light sources 37g1-g4 and 46e1-e4 (shown), and the other light sources 37 and 46 (not shown) behind them, also illuminate document 35 on glass plate 36 as generally represented by dashed lines 42c and 42d. The image of document 35 travels as represented dashed lines 43a&b reflects off mirror 32, travels as represented by dashed lines 44a&b through beam splitter 39, and through optics 34 which focuses the image of document 35 into charge coupled device (CCD) camera 33.

While only two light source mounting circuit boards 31b and 31d are shown in FIG. 4, and circuit boards 31a and 31c are deleted to avoid obscuring how document 35 is illuminated, boards 31a and 31c (not shown) illuminate document 35 in the same manner as boards 31b and 31d. If another side view were shown, but rotated ninety degrees from FIG. 4, the illumination of document 35 would be the same but mirror 32, beam splitter 39 and camera 33 would be rotated ninety degrees.

As previously mentioned, ones of white light sources 37 and 46 on each of circuit boards 31a-31d are selectively energized at different power levels to produce different levels of intensity. The light from the different light sources combine to effectively illuminate document 35 at different angles relative to its surface to expose OVDs on or in document 35 and its laminate (not shown) per the teaching of the present invention.

In the prior art, sets of one or more white light sources located at different physical positions with respect to a document are energized to illuminate a document at different angles to disclose OVDs. The angles of the light upon a document that can be selected are fixed. This is not done with the present invention. Rather, all white light sources remain lit but the intensity of different ones of the white light sources are varied under control of CPU 19 to effectively change, in three dimensional space, the angle of the white light upon a document 35 between a minimum and maximum. In this manner, no matter what direction and angle of white light is required to make visible OVDs in or on a document 35 and in its laminate or coating, the angle of the white light can be changed to meet the requirement. In addition, the angle can be varied over its adjustment range to search for the presence of an OVD. While changing the angle of white light is taught in this specification, the teaching may be used with respect to other visible or invisible wavelengths of light or energy sources.

This total angle control permits control of the LEDs on individual ones of light mounting circuit boards 31a-to effectively rotate the direction of the incident white light around an axis substantially perpendicular to the plane of document 35.

For one detailed example of the lighting control, when white LEDs 46 are brightly lit and white ones of LEDs 37 on either board 31b or 31d in FIG. 4 are subdued, the effective angle of incidence of the white light on document 35 is at its maximum with respect to the plane of glass plate 36, which is closer to β degrees as shown in FIG. 4. Conversely, when white LEDs 46 are subdued, and white ones of LEDs 37 are lit at their maximum, the effective angle of incidence of the white light on document 35 is at its minimum with respect to the plane of glass plate 36, which is closer to α degrees in FIG. 4. As the intensity of the white LEDs 37 and 46 is varied between their maximum and minimum intensities the effective angle of incidence of the white light on document 35 may be effectively varied between the minimum and maximum angles which are effectively and respectively closer to α degrees and β degrees. For another example, when all white LEDs 37 and 46 on boards 31a, b & c are subdued, and white light from LEDs on board 31d are utilized as described above, the direction of the white light with respect to board 31d can be varied.

The near infrared light sources 37b1-b4, f1-f4, c2, c4, d2, d4, e2 & e4, and ultraviolet A, B & C light sources 38a-c are used to illuminate document 35 with different wavelengths of light to expose and read various information on document 35 and to detect various security features utilized in document 35 or its laminating material. A separate coaxial light source 40 not mounted on circuit boards 31a-d is described hereinafter.

Near infrared light from LEDs 37b1-b4, 37f1-f4, 37c2, d2, e2, c4, d4 and e4 provides "indirect" lighting and reflects from and makes certain black inks made with carbon black visible, but will not reflect from other black inks, even though there is no difference to the unaided eye between these black inks. Printing on a passport is generally in black, but predetermined items on the passport will be printed with the special carbon black based black inks. When illuminated with the near infrared LED light this latter printing will visibly appear, while all other black printing disappears. CPU 19, under control of its stored program, knows where to look in a digitized video image from camera 33 made under illumination of the near infrared light sources for the carbon black ink printing from information stored in a document attribute and anti-counterfeiting feature library associated with each type of document. If the carbon black ink images are in the specified areas they are rendered visible and identified by CPU 19 in FIG. 1 as an indication that the passport 35 in document reader 10 has not been altered and is not counterfeit. This is not an absolute verification because other areas on the passport may be altered without touching the carbon black ink printing in the predetermined areas. Other verification tests, as described hereinafter, help to provide a more certain verification whether or not passport 35 has or has not been altered or is counterfeit. Newer "converter" inks and pigments absorb energy at one wavelength and re-emit light at another wavelength. Optically variable inks have a color change when the angle of illumination changes.

The term "direct" lighting used in the following paragraphs refers to lighting where the light illuminating a passport or other document 35 travels parallel to the viewing position of passport 35. The term "indirect" light sources refers to incident light that travels a path different than the reflected light.

Another illumination source to be energized is "direct" lighting by an infrared light source. Direct infrared light is generated by LEDs 40. LED 40 represents an array of infrared Light Emitting Diodes (LEDs) which are energized at different power levels and are pulsed on an off at different frequency rates. This infrared illumination is not affected by normal scuff marks and scratches, fingerprints and dirt on the surface of the laminate. In addition, when a retroreflective laminate is illuminated with direct infrared light the image captured is a continuous gray and any logo does not appear. It looks like a clean, gray slate. The continuous gray is easily detected as an indication of the presence of the retroreflectivematerial. Any alterations to and tampering with the retroreflective laminate appear as black marks on the gray background and are easily detected. Further, at increased power levels the direct infrared illumination is reflected from the bottom surface of the laminate or the surface of the passport page which is laminated in a manner that reveals the use of unauthorized laminates, and alterations to the laminate.

Infrared light from the direct infrared light source 40 is incident upon and reflected from document 35 as follows. Infrared light generated by LEDs 40 is incident upon beam splitter 39 from which most of it reflects following a path indicated by dashed line 45a. This infrared light is incident upon and reflects from document 35. The reflected light follows a path indicated by dashed line 45b. This reflected light is incident upon beam splitter 39. Some of the light is reflected from beam splitter, but most passes through and is incident upon optics 34 which images document 35 into camera 33. With the incident light following path 45a and the reflected light following path 45b we have "direct" or coaxial lighting.

In addition, the "direct" and "indirect" lighting infrared LEDs may be pulsed to achieve higher peak power levels that provide greater illumination of document 35 to help expose security markings and unauthorized alterations at different levels within the document. The frequency of pulsing the infrared LEDs is high enough that the pulsing cannot be detected by camera 33.

While what has been described herein is the preferred embodiment of the invention those skilled in the art will understand that numerous changes may be made without departing from the spirit and scope of the invention. For a first example, although only the use of white light sources are described with reference to changing the angle of white light on a document to expose OVDs or to ignore and see through OVDs, the technique may be used with lighting of a singular visible light wavelength or with lighting having non-visible light wavelengths.

Further, rather than using a plurality of individual LEDs, as shown in FIG. 3, a single source of white or infrared light may be used and the light distributed via fiber optic cable to the locations on boards 31a-d where LEDs are now located.

The invention claimed is:

1. Apparatus for illuminating documents or other items that may be laminated, have special inks or special coatings, and special security features, to expose optically variable devices and other indicia in or on the documents and their laminates, where the illumination must be from different directions with respect to the surface of a document for the optically variable devices and other indicia to be seen, said apparatus comprising:
    a first plurality of lights emitting light at a given wavelength that are positioned with respect to a document to illuminate it from selected ones of a first range of different directions, and wherein each of the individual lights comprising the first plurality of lights are located at different positions to illuminate the document from the selected ones of the first range of different directions;
    a second plurality of lights emitting light of the given wavelength that are positioned with respect to the document to illuminate it from selected ones of a second range of different directions, and wherein each of the individual lights comprising the second plurality of lights are located at different positions to illuminate the document from the selected ones of the second range of different directions; and
    means for energizing different ones of the first plurality of lights and different ones of the second plurality of lights at different levels of intensity;
    wherein ones of the first plurality of lights and ones of the second plurality of lights are lit at independently different levels of intensity to thereby change the direction from which illumination impinges upon the document; and
    wherein after ones of the first plurality of lights and ones of the second plurality of lights are selected to pick the direction from which the document will be illuminated, the intensity of illumination of the selected ones of the first plurality and the second plurality of light sources is changed accordingly to view optically variable devices and other indicia in or on the documents and their laminates or coatings.

2. The invention in accordance with claim 1 wherein when the first plurality of lights and the second plurality of lights are lit at different levels of intensity, the intensity of the first plurality of lights is increased as the intensity of the second plurality of lights is decreased and vice versa.

3. The invention in accordance with claim 2 wherein the first plurality of lights and the second plurality of lights are located below and to a first side of a document to be illuminated, and further comprising:
    a third plurality of lights that are positioned with respect to a document to illuminate it from selected ones of a third range of different directions, and wherein each of the individual lights comprising the third plurality of lights are located at different positions to illuminate the document from the selected ones of the third range of different directions;
    a fourth plurality of lights that are positioned with respect to a document to illuminate it from selected ones of a fourth range of different directions, and wherein each of the individual lights comprising the fourth plurality of lights are located at different positions to illuminate the document from the selected ones of the fourth range of different directions; and
    means for energizing the third plurality of lights and the fourth plurality of lights at different levels of intensity, wherein ones of the third plurality of lights and ones of the fourth plurality of lights are lit at independently different levels of intensity to thereby change the direction from which illumination impinges upon the document;
    wherein after ones of the third plurality of lights and ones of the fourth plurality of lights are selected to pick the direction from which the document will be illuminated, the intensity of illumination of the selected ones of the third plurality and the fourth plurality of linht sources is changed accordingly to view optically variable devices and other indicia in or on the documents and their laminates or coatings.

4. The invention in accordance with claim 3 wherein the first and second plurality of lights or the third and fourth plurality of lights are selectively lit by the energizing means to change the direction from which their light illuminates the document.

5. The invention in accordance with claim 4 wherein the first and the third plurality of lights comprise light emitting diodes that emit white light and near infrared light, and ones of these light emitting diodes are energized by the energizing means to illuminate the document with white light or near infrared light.

6. The invention in accordance with claim 1 further comprising:
    a third plurality of lights that are positioned with respect to a document to illuminate it from selected ones of a third range of different directions, and wherein each of the individual lights comprising the third plurality of lights are located at different positions to illuminate the document from the selected ones of the third range of different directions;
    a fourth plurality of lights that are positioned with respect to a document to illuminate it from selected ones of a fourth range of different directions, and wherein each of the individual lights comprising the fourth plurality of lights are located at different positions to illuminate the document from the selected ones of the fourth range of different directions; and
    means for energizing the third plurality of lights and the fourth plurality of lights at different levels of intensity, wherein ones of the third plurality of lights and ones of the fourth plurality of lights are lit at independently different levels of intensity to thereby change the direction from which illumination impinges upon the document;
    wherein after ones of the third plurality of lights and ones of the fourth plurality of lights are selected to pick the direction from which the document will be illuminated, the intensity of illumination of the selected ones of the third plurality and the fourth plurality of light sources is changed accordingly to view optically variable devices and other indicia in or on the documents and their laminates or coatings.

7. The invention in accordance with claim 6 wherein the first and second plurality of lights or the third and fourth plurality of lights are selectively lit by the energizing means to change the direction from which light illuminates a document.

8. The invention in accordance with claim 7 wherein the first and the third plurality of lights comprise light emitting diodes that emit white light and near infrared light, and ones of these light emitting diodes are energized by the energizing means to illuminate the document with white light or near infrared light.

9. A method for illuminating documents that may be laminated to expose optically variable devices and other indicia in or on the documents and other items and their laminates, where the illumination must be from specific directions with respect to the surface of a document and its laminates for the optically variable devices and other indicia to be seen, said method comprising the steps of:
  illuminating the document with a first plurality of light sources located at different positions and emitting light of a given wavelength to illuminate the document from different directions;
  illuminating the document with a second plurality of light sources located at different positions and emitting light of the given wavelength to illuminate the document from different directions;
  varying the intensity of the illumination from the first plurality of light sources and the second plurality of light sources to change the direction from which the illumination impinges on the document;
  wherein after ones of the individual light sources comprising the first plurality of light sources and the second plurality of light sources are selected to pick the direction from which the document will be illuminated, the intensity of the illumination form the selected ones of the first plurality and the second plurality of light sources is changed accordinaly to view optically variable devices and other indicia in or on the documents and their laminates or coatings, 10. A method for illuminating documents and other items that may be laminated to expose optically variable devices and other indicia in or on the documents and their laminates, where the illumination must be at specific angles with respect to the surface of a document and their laminates for the optically variable devices and other indicia to be seen, said method comprising the steps of:
  illuminating the document with a selected one of a groups of lights where each group of lights comprises a set of light sources, each set of light sources are located at a different position to illuminate the document from different directions, and wherein one of each set of light sources illuminates the document at a first angle and the other of each set of light sources illuminates the document at a second angle; and
  varying the intensity of the illumination from each of the sets of light sources of the selected group of lights to effectively vary the angle of light on the document between the first angle and the second angle.

11. The method in accordance with claim 10 wherein when the intensity of one of a set of light sources is increased the intensity of the other of the set of light sources is decreased and vice versa.

\* \* \* \* \*